No. 694,171. Patented Feb. 25, 1902.
P. MINK.
BARREL CLOSURE.
(Application filed Aug. 19, 1901.)
(No Model.)

Witnesses:—
Fred W. Englert
Percy C. Bowen

Inventor:—
Peter Mink
by Wilkinson & Fisher
Attorneys.

THE NORRIS PETERS CO., PHOTO-LITHO., WASHINGTON, D. C.

UNITED STATES PATENT OFFICE.

PETER MINK, OF NIEDERZEUZHEIM, GERMANY.

BARREL-CLOSURE.

SPECIFICATION forming part of Letters Patent No. 694,171, dated February 25, 1902.

Application filed August 19, 1901. Serial No. 72,628. (No model.)

*To all whom it may concern:*

Be it known that I, PETER MINK, a subject of the German Emperor, residing at Niederzeuzheim, near Limburg-on-the-Lahn, Germany, have invented certain new and useful Improvements in Barrel-Closures; and I do hereby declare the following to be a full, clear, and exact description of the invention, such as will enable others skilled in the art to which it appertains to make and use the same.

My invention has for its object to provide a head or cover for casks and the like, which head or cover may be readily fixed at various depths to close the barrel or cask hermetically.

In carrying out my invention I take a ring of rubber or other sufficiently elastic material slightly less in external diameter than the internal diameter of the cask. This rubber ring is disposed between two plates which form the head or cover, and I provide means for exerting pressure from the center of the head outward, so as to increase the diameter of the elastic ring, thus producing a seal, while the pressure is maintained. An aperture may be provided in the head in which to put a tap.

In order that my invention may be clearly understood, I will proceed to describe the same with reference to the drawings accompanying this specification, in which—

Figure 2:
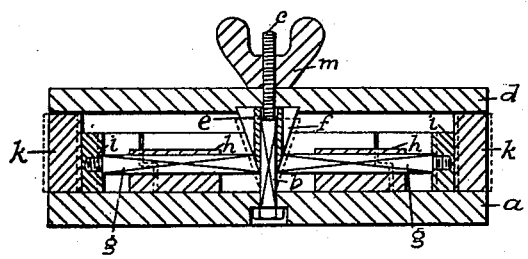
Figure 4:
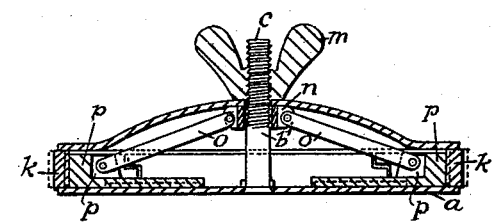
Figure 1:
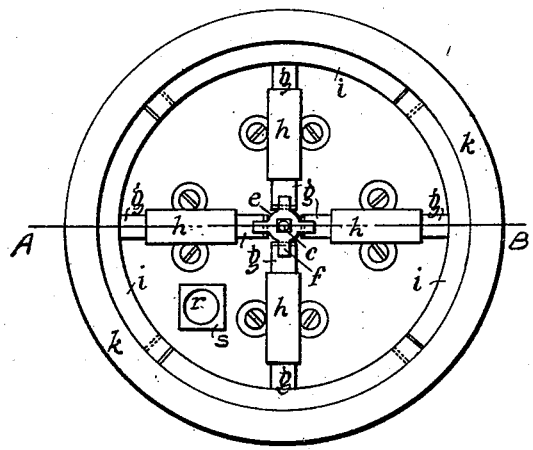
Figure 3:
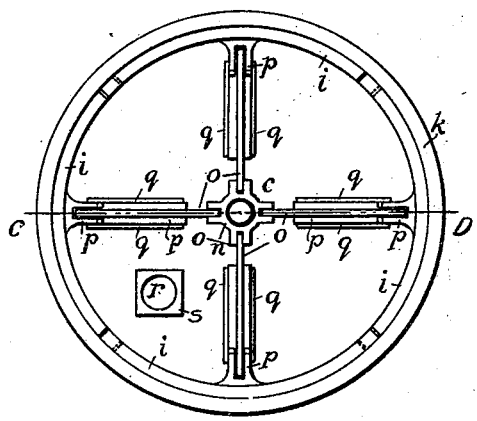

Figure 1 is a plan showing one way of constructing a cask-head according to my invention, the top plate being removed. Fig. 2 is a section on line A B, Fig. 1. Fig. 3 is a plan showing a second way of constructing a cask-head according to this invention, the upper plate being removed. Fig. 4 is a section on line C D, Fig. 3.

The same letters of reference are employed to denote the same parts in all the views.

Referring first to Figs. 1 and 2, $a$ shows a plate in which is fixed in the center a pin, the lower part $b$ of which is square in cross-section and the upper part $c$ round and formed with a thread. $d$ shows another plate of the same diameter as the lower plate $a$ and provided with a hole through which the screw-pin $c$ projects. $e$ shows a sleeve with a square hole fitting on the square pin $b$ and having four wedges $f$ projecting from it, as shown. $g$ shows bars, rectangular in cross-section, fitted to slide in guide-blocks $h$, fixed to the lower plate $a$. The outer ends of these bars $g$ are screwed into segmental pieces of metal $i$, and the inner ends of the said bars are beveled to correspond with the taper of the wedges $f$. The four segmental pieces $i$ together form a complete ring, their ends being so shaped that each overlaps the next, as shown. $k$ denotes a ring, of rubber or other elastic material, fitting around the outsides of the segmental pieces $i$. $m$ shows a nut screwing on the screw $c$. $r$ shows an aperture to receive the tap, and $s$ a washer to same. When the head or cover is inserted in a cask or barrel and the nut $m$ screwed down, the wedges $f$ force the bars $g$ outward, and the segmental pieces $i$, attached to the latter, force the elastic ring $k$ outward, thereby sealing the cask. By simply unscrewing the nut $m$ the ring $k$ is allowed to return to its normal diameter and the head can be easily removed.

Referring now to Figs. 3 and 4, it will be seen that instead of the wedges and bars just described I employ a framework acting after the manner of the ribs of an umbrella. The central pin in this case is preferably round in cross-section throughout, and the upper part $c$ is threaded, as before. A sleeve $n$ fits on the portion $b'$ of the said pin, and to the sleeve are pivoted four links $o$, pivoted at their outer ends to arms $p$, extending from the segmental pieces $i$. The arms $p$ slide between guide-bars $q$, fixed to the lower plate $a$. In this case the rubber ring $k$ is expanded by the thrust exerted by the links $o$ when the nut $m$ is screwed down.

I may in some cases lengthen the central pin and provide it with a knob or handle at the upper end in order to hold the head or cover while it is being fixed in position.

What I claim, and desire to secure by Letters Patent, is—

1. In a head for barrels and vessels, the combination with a casing having top and bottom plates, of an annular elastic band interposed between said plates, a bolt extending through said plates, segmental sections within said casing and engaging said elastic band, a sleeve loosely mounted on said bolt between said plates, rods connected to said segmental sections and engaging said sleeve, and a nut on said bolt adapted to engage and depress said top plate for operating said sleeve and rods.

2. In a head for barrels and vessels, the combination with a casing having top and bottom plates, of an annular elastic band inserted between said top and bottom plates, segmental sections within said casing adapted to exert a pressure against said band, rods connected to said segmental sections, a bolt extending through said plates, a wedge adapted to slide on said bolt between said rods and also between said plates, and a nut on said bolt adapted to depress said top plate and exert a pressure on said wedge to spread said rods apart, substantially as described.

3. In a head for barrels and vessels, the combination with a casing having top and bottom plates, of an annular elastic band inserted between said top and bottom plates, segmental sections within said casing adapted to exert a pressure against said band, rods connected to said segmental sections, a bolt extending through said plates and having a rectangular portion between said plates, a block adapted to slide on said rectangular part, and having wedge-surfaces adapted to engage said rods, and a nut on said bolt adapted to depress said top plate and exert a pressure on said block to spread said rods, substantially as described.

In testimony whereof I affix my signature in presence of two witnesses.

PETER MINK.

Witnesses:
JOSEF SIEBENHELLER,
JEAN GRUND.